United States Patent [19]

Plescia et al.

[11] Patent Number: 4,687,161
[45] Date of Patent: Aug. 18, 1987

[54] POINTING COMPENSATION SYSTEM FOR SPACECRAFT INSTRUMENTS

[75] Inventors: Carl T. Plescia, Sunnyvale; Donald W. Gamble, Palo Alto, both of Calif.

[73] Assignee: Ford Aerospace & Communications Corporation, Detroit, Mich.

[21] Appl. No.: 802,121

[22] Filed: Sep. 30, 1985

[51] Int. Cl.$^4$ ............................................. B64G 1/36
[52] U.S. Cl. .................................. 244/171; 342/355; 342/358; 244/164; 318/648
[58] Field of Search ................. 244/158 R, 164, 165, 244/166, 169, 170, 173, 171; 364/459, 432, 534; 318/582, 648, 649, 580; 74/5.34; 343/355–358, 352, DIG. 2

[56] References Cited

U.S. PATENT DOCUMENTS

| | | | |
|---|---|---|---|
| 3,877,662 | 4/1975 | Reiter et al. | 244/164 |
| 4,021,716 | 5/1977 | Rue | 318/648 |
| 4,143,312 | 3/1979 | Duckworth et al. | |
| 4,272,045 | 6/1981 | Phillips | |
| 4,325,586 | 4/1982 | Hubert et al. | |
| 4,334,226 | 6/1982 | Eguchi et al. | 343/355 |
| 4,355,313 | 10/1982 | Hubert | |
| 4,375,878 | 3/1983 | Harvey et al. | |
| 4,418,306 | 11/1983 | Samsel | |
| 4,437,047 | 3/1984 | Smay | |

FOREIGN PATENT DOCUMENTS 2502404  9/1982  France ............................ 244/164

Primary Examiner—Galen Barefoot
Attorney, Agent, or Firm—Edward J. Radlo; Keith L. Zerschling

[57] ABSTRACT

A closed loop system reduces pointing errors in one or more spacecraft instruments. Associated with each instrument is a electronics package (3) for commanding motion in that instrument and a pointing control system (5) for imparting motion in that instrument in response to a command (4) from the commanding package (3). Spacecraft motion compensation logic (25) compensates for instrument pointing errors caused by instrument-motion-induced spacecraft motion. Any finite number of instruments can be so compensated, by providing each pointing control system (5) and each commanding package (3), for the instruments desired to be compensated, with a link to the spacecraft motion compensation logic (25). The spacecraft motion compensation logic (25) is an electronic manifestation of the algebraic negative of a model of the dynamics of motion of the spacecraft. An example of a suitable model, and computer-simulated results, are presented.

5 Claims, 5 Drawing Figures

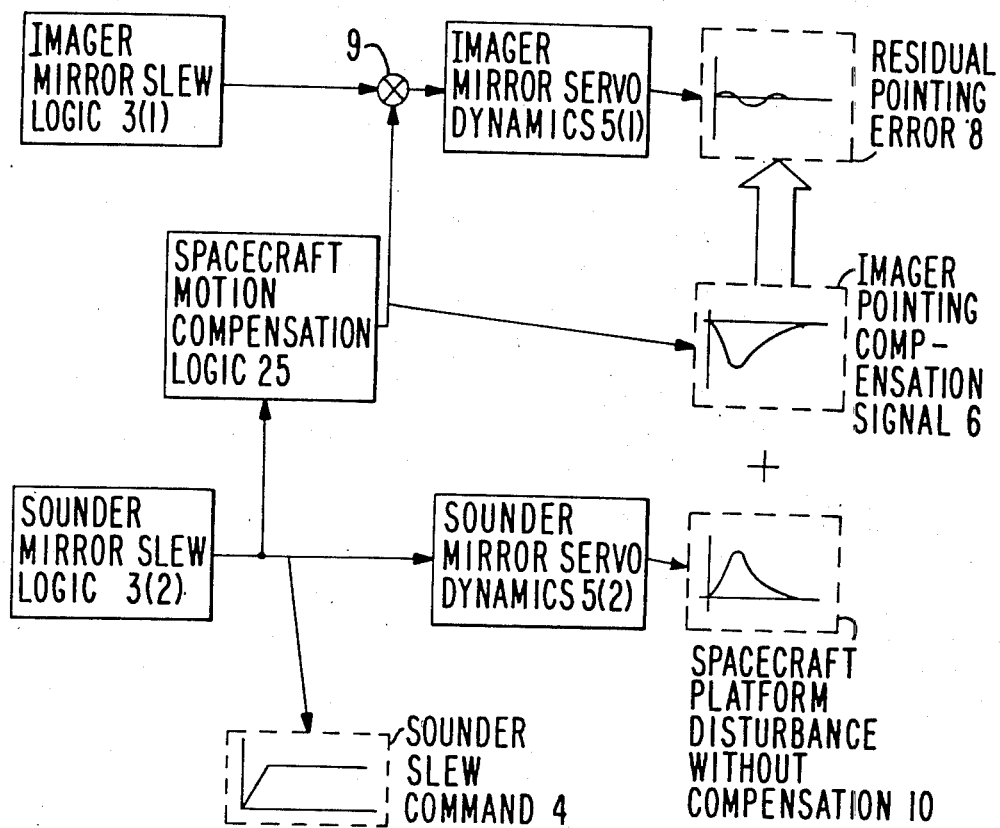
FIG. 3 IMAGE COMPENSATION POINTING CONTROL SYSTEM
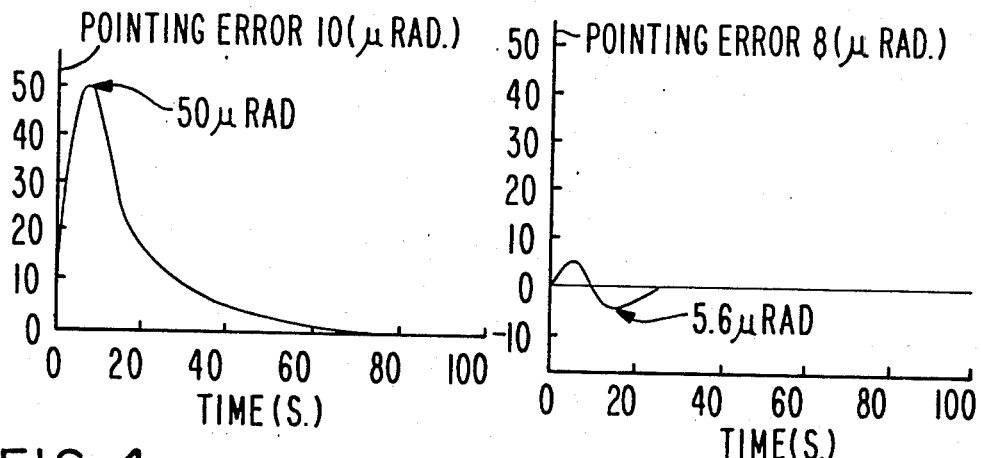
FIG. 4 UNCOMPENSATED IMAGER 1 POINTING ERROR 10 DUE TO SOUNDER 2 CALIBRATION SLEW
FIG. 5 COMPENSATED IMAGER 1 POINTING ERROR 8 DUE TO SOUNDER 2 CALIBRATION SLEW

POINTING COMPENSATION SYSTEM FOR SPACECRAFT INSTRUMENTS

DESCRIPTION

The invention described herein was made in the performance of work under NASA Contract No. NAS5-29500 and is subject to the provisions of Section 305 of the National Aeronautics and Space Act of 1958, as amended (72 Stat. 435; 42 U.S.C. 2457).

TECHNICAL FIELD

This invention pertains to the field of reducing errors in pointing spacecraft instruments, said errors caused by spacecraft motion induced by motion of one or more of the instruments.

BACKGROUND ART

U.S. Pat. No. 4,437,047 discloses a closed loop control system which provides torque command signals to a torque motor that controls the pointing position of the payload platform of a dual-spin satellite. As shown in FIG. 1, the satellite 20 includes a spinning portion 21 and a payload platform 22 having a predetermined line-of-sight 26. The spinning portion 21 includes an infrared earth sensor 25 providing an output pulse when the sensor is viewing the earth. The control system shown in FIGS. 3 and 4 uses the pulses produced by the earth sensor 25 and pulses representing the line-of-sight 26 to provide the torque command signals 57, 58 to control the spinning portion 21.

U.S. Pat. No. 4,143,312 discloses a control system for stabilizing a rotatable antenna mounted on a body to compensate for the pitch and roll of the body. FIG. 1 illustrates the antenna 1 mounted on a platform 3 carried on a deck 4 of a ship by a two-axis gimbal system including a frame 5. The frame 5 is rotatable about a horizontal roll axis 8. The stabilized platform 3 is rotatable about a horizontal pitch axis 9. FIG. 3 depicts a portion of the control system and includes synchro transmitters 10R, 10P to detect relative movement of the antenna 1 about the roll axis 8 and the pitch axis 9. Output from the roll transmitter 10R is applied to a control transformer 11R which also derives an input 17 of roll data from the ship's vertical reference unit (not shown). Based on this data and corresponding pitch data, the positioning of the antenna 1 is stabilized to compensate for the pitch and roll of the ship.

Secondary references are U.S. Pat. Nos. 4,272,045; 4,325,586; 4,355,313; 4,375,878; and 4,418,306.

DISCLOSURE OF INVENTION

The invention is a closed loop system for reducing pointing errors in one or more spacecraft instruments, where the errors are caused by spacecraft motion induced by motion of one or more of the instruments. An instrument can be compensated for errors caused by its own motion (self-compensation). Each instrument has means (3) for commanding motion in that instrument, and a pointing control system (5) for imparting motion in that instrument in response to command signals (4) emanating from the commanding means (3). A spacecraft motion compensation logic (25) is coupled to each commanding means (3) and to each pointing control system (5).

The spacecraft motion compensation logic (25) is an electronic circuit embodying the algebraic negative of a model of the dynamics of motion of the spacecraft. This electronic circuit (25) can be implemented in analog or digital form.

The present invention's ability to greatly reduce dynamic interaction among spacecraft instruments has an important byproduct in simplified ground operations. Thus, the motion compensation system described herein promotes fully independent operation of each instrument, with the attendant savings in cost and manpower, while enhancing overall system performance.

BRIEF DESCRIPTION OF THE DRAWINGS

These and other more detailed and specific objects and features of the present invention are more fully disclosed in the following specification, reference being had to the accompanying drawings, in which:

FIG. 3 illustrates a special case of FIG. 2 pertaining to a momentum bias satellite, that illustrated in FIG. 1;

FIG. 4 is a graph of pointing error 10 as a function of time for the configuration underlying FIG. 3 when the present invention is not used; and FIG. 5 is a graph of pointing error 8 as a function of time for the configuration underlying FIG. 3 when the present invention is used.

BEST MODE FOR CARRYING OUT THE INVENTION

Figure 1:
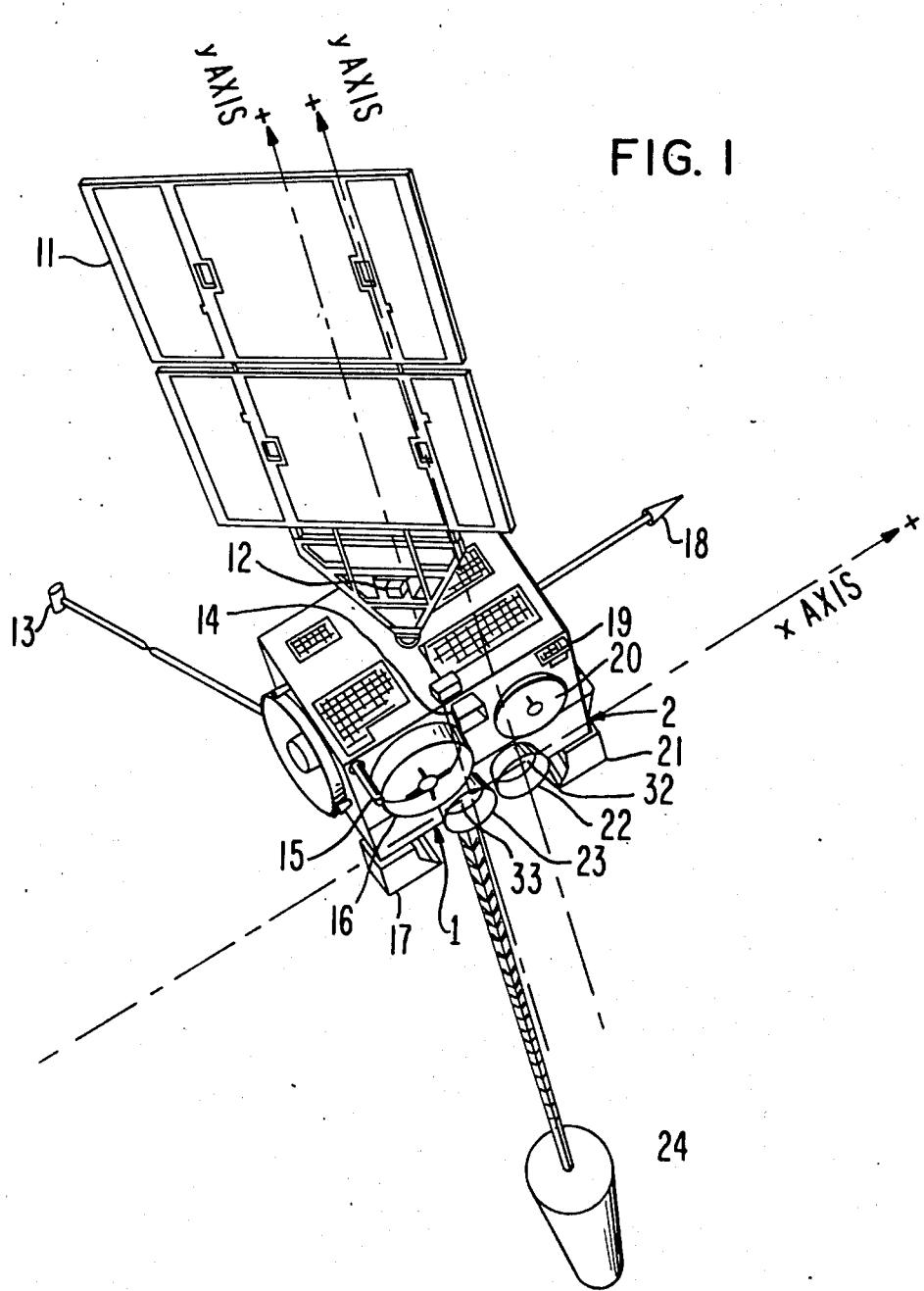
FIG. 1 is an elevational view of a satellite which can advantageously employ the present invention.

This invention has utility on any type of spacecraft and for any finite number of instruments thereon, e.g., cameras, antennas, solar panels, which need to be precisely pointed. The invention will be particularly illustrated with respect to the spacecraft illustrated in FIG. 1. This spacecraft is NASA's GOES I/J/K meteorological satellite. The items shown on FIG. 1 include solar array 11, x-ray sensor 12, magnetometor 13, S-band transmit antenna 14, SAR (search and rescue) antenna 15, UHF antenna 16, telemetry and command antenna 18, earth sensors 19, S-band receive antenna 20, solar sail 24, imager 1, and sounder 2. Imager 1 comprises cooler 17, aperture 23, and mirror 33. Sounder 2 comprises cooler 21, aperture 22, and mirror 32.

The mirrors 33, 32 are each mounted on a two-axis gimbal which selectively positions the mirror 33, 32 with respect to orthogonal x and y axes at a scan rate of many successive positions per second. The x axis can be referred to as the roll, north/south, or elevation axis. The y axis can be referred to as the pitch, east/west, or azimuth axis.

Imager 1 provides radiometric imaging of the earth's surface. Imager 1 has five channels, four infrared and one visible; its two-axis gimbaled scanning mirror 33 sweeps an eight kilometer longitudinal swath along an east/west path on the earth, providing co-registered data of the viewed scene from all channels simultaneously. Position and size of the area scanned are controlled by command. At the end of each scan frame, mirror 33 slews to an infrared blackbody within imager 1 for purposes of calibration. Imager 1 also calibrates by sensing stars to provide precise earth location and optical axis correlation data.

Sounder 1 measures moisture content and temperature within the earth's atmosphere. Sounder 2 comprises a 19 channel (18 IR and 1 visible) discrete filter wheel radiometer; its two-axis gimbaled scanning mirror 32 step-scans a 40 kilometer longitudinal swath across an east/west path in 10 kilometer increments. Passive radiation cooler 21 controls the filter wheel assembly temperature. This allows operation at lower temperature for increased sensitivity. Radiometric calibration is provided by periodic mirror 32 slews to space and to an internal blackbody target.

Figure 2:
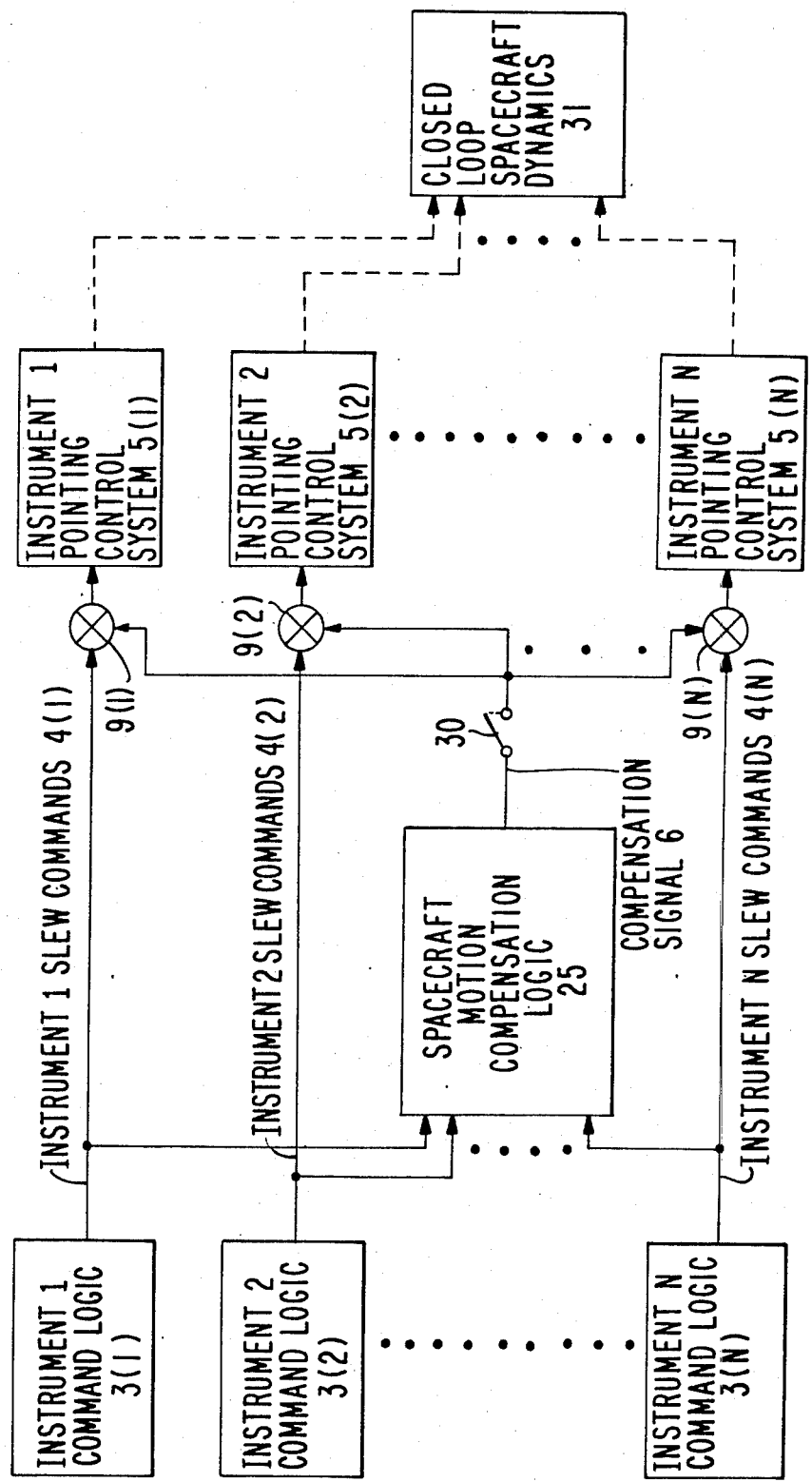
FIG. 2 is a generalized functional block diagram of an N-instrument embodiment of the present invention.

Later on in this specification, with reference to FIGS. 3-5, we will illustrate the pointing compensation of imager 1 and sounder 2. But first, a generalized description of the invention is shown in FIG. 2, in which each of N instruments, for which pointing compensation is desired, comprises command logic 3, typically an electronics package which commands pointing of the respective instrument via slew commands 4. Each instrument further comprises a pointing control system 5 for imparting pointing motion to the instrument. Spacecraft motion compensation logic 25 normally operates continuously, and accepts as inputs the slew commands 4 from each of the instruments, and outputs a compensation signal 6 to each of the pointing control systems 5 via summers 9. The compensation signal 6 can be interrupted at will by means of opening an override switch 30 upon a command from the ground received via the spacecraft's telemetry.

Spacecraft motion compensation logic 25 comprises the algebraic negative of a model of the dynamics of motion of the spacecraft. Thus, compensation signal 6 commands the instruments to do the opposite of what the spacecraft is expected to do in response to the slew commands 4. This compensation signal 6 is input into the instruments via their pointing control systems 5. Since this is a closed loop system, the closed loop spacecraft dynamics themselves, which are labeled as box 31 on FIG. 2, cause the spacecraft itself to move as a result of the slewing of the instruments, but the pointing of the instruments is compensated therefor.

Returning to the FIG. 1 example, a major source of pointing disturbances to imager 1 is sounder mirror 32's slewing motion during operation of imager 1. These slewing motions have been analyzed, along with imager mirror 33 motion effects on sounder 2, and found to introduce significant errors. The instant onboard pointing compensation system, using estimated spacecraft dynamics and controls, compensates for those motions so that their effects are minimal.

Consider for example the response of imager 1, sounder 2, and the spacecraft platform to a sounder mirror 32 slew, as illustrated by FIG. 3. The slew starts with a command 4 generated in the sounder slew logic block 3(2) and sent to the sounder mirror servo dynamics 5(2). Command 4 conveys the desired mirror 32 angles about its x and y axes, with respect to arbitrary reference angles. While the high bandwidth mirror control loop 5(2) tracks the command 4 accurately, mirror 32 momentum exchanged with the spacecraft can cause as much as a 50 microradian transient spacecraft disturbance 10 and concomitant imager 1 pointing error. Disturbance 10 is more fully shown in FIG. 4.

To compensate the imager mirror 33 pointing, compensation logic 25 simultaneously processes the sounder slew command 4 in real time, anticipates the resulting platform motion, and sends compensation signal 6 to the imager mirror servo dynamics 5(1) via summer 9. Since compensation signal 6 is equal in magnitude and reversed in polarity to that representing disturbance 10, the imager mirror 33 moves to cancel the spacecraft platform disturbance 10, leaving just a residual pointing error 8, which is more fully shown in FIG. 5.

FIG. 4 shows the uncompensated response 10 of the spacecraft platform to a 180° blackbody calibration slew of sounder mirror 32 about its y axis at the rate of 10°/second. If this error 10 were not compensated, the resulting disturbance to imager 1 would peak at 48.3 microradians.

FIG. 4 shows that the uncompensated response 10 is sufficiently slow that a digital computer implementation of compensation logic 25 can easily perform even a complex series of steps many times during the uncompensated damping interval (about 72 seconds).

If compensation logic 25 contained a perfect model of the spacecraft dynamics, then perfect pointing compensation and zero imager 1 pointing error 8 would result. FIG. 5 shows the dynamic response of the imager disturbance 8 for a 20% "modeling error" (defined infra). This is a conservative estimate of actual error, because in reality, spacecraft inertias, the main contributors to errors, are known to within ±5%. The compensated response 8 has a maximum error of 5.6 microradians.

FIG. 3 shows compensation only for the effects of sounder 2 on imager 1. In reality, logic 25 also continuously compensates for the impact of imager 1 on sounder 2, for the impact of imager 1 on itself, and for the impact of sounder 2 on itself. Continuous motion compensation is being implemented on the GOES I/J/K satellites for the effects of normal mirror 33, 32 step-scanning, as well as slewing (e.g., frame retrace, blackbody and deep space calibration slews). Although the pointing compensation system is used at all times, it provides its major benefit during slew modes, when instrument interaction is greatest in terms of angular position and angular velocity. For example, during calibration of sounder 2, its mirror 32 can be slewed over 180° in a relatively short period of time (18 seconds).

Table 1 shows the results of instrument 1, 2 pointing errors for 10% and 50% modeling errors, as well as the 20% modeling error illustrated in FIG. 5. For purposes of this Table, it matters not whether the victim instrument is imager 1 or sounder 2, because they are assumed to have the same physical characteristics.

TABLE 1

|  | Peak Pointing Error | |
| --- | --- | --- |
|  | (°) | (μrad) |
| Instrument pointing error without compensation | 0.00277 | 48.3 |
| Instrument pointing error with 10% modeling error | 0.00018 | 3.1 |
| Instrument pointing error with 20% modeling error | 0.00032 | 5.6 |
| Instrument pointing error with 50% modeling error | 0.00068 | 11.9 |

It can be seen from Table 1 that compensation logic 25 is not very sensitive to "modeling error", an error intentionally added to the torque/inertia ratio for each of the x and y axes for the model embedded within compensation logic 25, compared with said ratios used in the model for spacecraft dynamics 31.

Linear transfer function models of each functional block of FIG. 3 were developed, analyzed, and computer simulated, to provide the data for Table 1. Four distinct transfer functions were developed for the two instruments:

1. Mirror slew logic 3, which produces slew command functions such as the ramp 4 shown in FIG. 3. The transfer function is $V_R/s^2$ where: s is the Laplace operator (differentiator); and $V_R$ is the slew rate magnitude (about any axis).
2. Mirror servo-control dynamics 5, a closed-loop transfer function model of the mirror control system. The transfer function is $W^2/(s^2+2.0ZWs+W^2)$ where: Z is the damping ratio of mirror servo-control dynamics 5; and W is the undamped natural frequency of mirror servo-control dynamics 5.
3. Closed loop spacecraft dynamics 31, a detailed closed loop model of pitch and roll/yaw spacecraft dynamics simulating the actual platform dynamics. In the GOES I/J/K satellites, two operational momentum wheels provide stiffness about the pitch axis and gyroscopic coupling between the roll and yaw axes. The transfer function is given below.
4. Motion compensation logic 25, the algebraic negative of the model of spacecraft dynamics 31. For the Table 1 error analysis, compensation logic 25 is intentionally made to depart in a prescribed fashion from the model for spacecraft dynamics 31.

The model used for spacecraft motion compensation logic 25 is given by the following two equations. The compensation signal 6 comprises x and y axis components, $C_x(s)$ and $C_y(s)$, respectively. This same compensation signal 6 is sent to each of the pointing control systems 5(1), 5(2). The equations are the algebraic negatives of the linear transfer functions of the satellite to disturbance torques produced by x and y axis motions of the instrument servos 5(1), 5(2).

Note that the transfer functions are linear functions of inertias and angles; their accuracy depends only on the tolerances in the knowledge of the rigid-body mass properties of the satellite and instrument servos 5(1), 5(2). Propellant slosh has no effect on satellite motion at the very low satellite accelerations produced by these mechanisms. Similarly, structural flexibility effects at the very small amplitudes of motion do not produce measurable differences in satellite motion. Because the mirrors 33, 32 have little mass compared with the satellite, and their servos 5(1), 5(2) are fast and track the input slew commands 4(1), 4(2) with little error, the dynamics of the servos 5(1), 5(2) do not have to be taken into account in these compensation equations.

Here, then, are the equations. Spacecraft motion compensation logic 25 is mechanized as a time domain realization of the following transfer functions:

$$C_x(s) = \frac{-1/I_x(I_{Ix}s^2 A_{Ix}(s) + I_{Sx}s^2 A_{Sx}(s))(s + 1/G)}{s^4 + s^3/G + J^2 s^2 + s(H - KL)J^2/HG + KJ^2/HG}$$

$$C_y(s) = \frac{-1/I_y(I_{Iy}s^2 A_{Iy}(s) + I_{Sy}s^2 A_{Sy}(s))(s^2 + 2PQs + Q^2)}{s^4 + 2PQs^3 + Q^2 s^2 + Rs + 1}$$

where:

s is the Laplace operator (differentiator).

$C_x(s)$ is the compensation angle for the x axis component of compensation signal 6 sent to each of the servos 5(1), 5(2).

$I_x$ is the moment of inertia of the satellite about its roll axis.

$I_{Ix}$ is the moment of inertia of imager mirror 33 about its x axis.

$I_{Sx}$ is the moment of inertia of sounder mirror 32 about its x axis.

$A_{Ix}(s)$ is the angular position of imager mirror 33 about its x axis, with respect to an arbitrary reference angle.

$A_{Sx}(s)$ is the angular position of sounder mirror 32 about its x axis, with respect to an arbitrary reference angle.

H is the total angular momentum of the satellite.

G, J, K, and L are constants that realize the closed-loop response of the satellite's roll and yaw attitude control loop.

$C_y(s)$ is the compensation angle for the y axis component of compensation signal 6 sent to each of the servos 5(1), 5(2).

$I_y$ is the moment of inertia of the satellite about its pitch axis.

$I_{Iy}$ is the moment of inertia of imager mirror 33 about its y axis.

$I_{Sy}$ is the moment of inertia of sounder mirror 32 about its y axis.

$A_{Iy}(s)$ is the angular position of imager mirror 33 about its y axis, with respect to an arbitrary reference angle.

$A_{Sy}(s)$ is the angular position of sounder mirror 32 about its y axis, with respect to an arbitrary reference angle.

P, Q, and R are constants that realize the closed-loop response of the satellite's pitch attitude control loop.

In the general case, where more than two instruments are desired to be compensated, the numerators of the equations for $C_x(s)$ and $C_y(s)$ are supplemented with terms representing disturbance torques emanating from the additional instruments.

Compensation logic 25 can be implemented in analog or digital form. For the example illustrated, compensation logic 25 is implemented as part of the onboard AOCE (attitude and orbital control electronics) digital microprocessor, in this case a miniaturized version of a Perkin Elmer/Interdata 5/16 minicomputer.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A system for reducing spacecraft instrument pointing errors caused by instrument-motion-induced spacecraft motion, said system comprising:

at least one instrument mounted on a spacecraft and disposed to point towards locations external to the spacecraft;

coupled to each instrument, motive means for changing the pointing direction of the instrument;

coupled to each motive means, commanding means for commanding motion in the instrument; and compensating means for compensating errors in spacecraft motion induced by instrument motion, said compensating means having an output coupled to each of the motive means and an input coupled to each of the commanding means, wherein the compensating means sends to each of the motive means a signal representative of the negative of the spacecraft motion expected as a result of motion in the instruments commanded by the commanding means.

2. The system of claim 1 wherein the compensating means comprises an electronic circuit embodying a model of the negative of the dynamics of motion of the spacecraft.

3. The system of claim 1 further comprising means for selectively disabling signals emanating from the compensating means, in response to signals sent from the earth.

4. The system of claim 1 wherein the spacecraft instruments comprise:

an imager having a mirror adjustably pointed at the earth by first motive means; and a sounder having a mirror adjustably pointed at the earth by second motive means.

5. The system of claim 4 wherein:

the imager and sounder are mounted on a face of a satellite; and the first and second motive means each comprise a two-orthogonal-axis gimbal for selectively pointing the mirrors of the imager and sounder, respectively, at locations on the earth.

* * * * *